United States Patent
Toy

(10) Patent No.: US 11,082,307 B2
(45) Date of Patent: Aug. 3, 2021

(54) E-LINE SERVICE CONTROL

(71) Applicant: Verizon Patent and Licensing Inc., Arlington, VA (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 16/391,688

(22) Filed: Apr. 23, 2019

(65) Prior Publication Data

US 2020/0204462 A1    Jun. 25, 2020

Related U.S. Application Data

(60) Provisional application No. 62/781,899, filed on Dec. 19, 2018.

(51) Int. Cl.
| | | |
|---|---|---|
| G06F 15/173 | (2006.01) | |
| G06F 15/16 | (2006.01) | |
| H04L 12/24 | (2006.01) | |
| H04L 12/825 | (2013.01) | |

(52) U.S. Cl.
CPC ...... H04L 41/5054 (2013.01); H04L 41/0896 (2013.01); H04L 41/5077 (2013.01); H04L 47/25 (2013.01)

(58) Field of Classification Search
CPC ............. H04L 41/5054; H04L 41/5077; H04L 41/0896; H04L 47/25
USPC ................................ 709/223–224, 249–250
See application file for complete search history.

(56) References Cited

U.S. PATENT DOCUMENTS

| | | | | |
|---|---|---|---|---|
| 8,379,656 B2* | 2/2013 | Waldrop | ............. | H04L 41/5054 370/401 |
| 8,392,509 B1* | 3/2013 | Kiessig | ............... | H04L 41/0803 709/223 |
| 8,582,630 B2* | 11/2013 | Wright | ................. | H04M 11/062 709/250 |
| 10,015,115 B2* | 7/2018 | Ranganathan | ...... | H04L 41/0806 |
| 2009/0122811 A1* | 5/2009 | Wu | ...................... | H04L 41/0896 370/468 |
| 2009/0287809 A1* | 11/2009 | Chen | ................... | H04L 41/0896 709/223 |
| 2012/0123829 A1* | 5/2012 | Chen | ..................... | H04L 49/351 709/224 |
| 2013/0194932 A1* | 8/2013 | Bencheck | ........... | H04L 41/0896 370/241.1 |
| 2016/0050119 A1* | 2/2016 | Chhabra | ............... | H04L 47/724 370/218 |

* cited by examiner

*Primary Examiner* — Bharat Barot

(57) ABSTRACT

A method may include receiving a first message requesting a change associated with an Ethernet service that includes routing data from a user device to a destination device via a first service provider and a second service provider. The method may also include determining, by the first service provider, whether resources are available in a first network associated with the first service provider to fulfill the requested change and determining, by the second service provider, whether resources are available in a second network associated with the second service provider to fulfill the requested change. The method may further include sending a second indicating whether the change is accepted and in response to determining that the change is accepted, automatically implementing the change for the Ethernet service.

20 Claims, 9 Drawing Sheets

E-LINE SERVICE CONTROL

RELATED APPLICATION

This application claims priority under 35 U.S.C. § 119 based on U.S. Provisional Application 62/781,899 filed Dec. 19, 2018, the contents of which are hereby incorporated herein by reference in their entirety.

BACKGROUND INFORMATION

Service providers, such as Ethernet services providers, often provide services to customers within a particular region. In some instances, Ethernet services may be desired across regions associated with different service providers. For example, a company may have office locations in different areas (e.g., different cities, states or countries) that are serviced by two different service providers. The Metro Ethernet Forum (MEF) has defined wholesale Ethernet Access Ethernet Line (E-Line) services for service providers that provide connectivity to subscriber locations. Furthermore, MEF has defined E-Line services providing point-to-point Ethernet Virtual Connections (EVCs) between subscriber locations where an Access E-Line service can be a segment of an end-to-end E-Line service.

For example, Access Ethernet Line (E-Line) services that provide point-to-point operator virtual connections (OVCs) are defined in MEF 51. However, there is currently no mechanism to permit modifications to E-Line and Access E-Line services without a user having to submit a new service order to one or more service provides, the service providers processing the new service order and then re-provisioning, for example, one or more OVCs based on the new service order.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing for modification of E-Line services in an "on-demand" manner. For example, implementations described herein allow a customer to request a change to an E-Line parameter without having to submit a new order and without the service provider having to re-provision a new E-Line. The service providers associated with the E-Line may determine whether adequate resources are available and may implement the change when adequate resources exist. Implementations described herein also provide for efficient signaling/message exchange between one service provider servicing the party requesting the change and a partner service provider servicing, for example, the destination location for the E-Line. The signaling and message exchange advantageously provide each service provider with necessary information regarding the requested change and ensure that the requested change can be implemented prior to accepting the change request. If the requested change can be implemented, the service providers may automatically implement the change in service. In this manner, the user may be able to make changes in an on-demand manner and be informed of results of the E-Line service change request without having to submit a new service order and wait a long time before the change is implemented.

Figure 1:
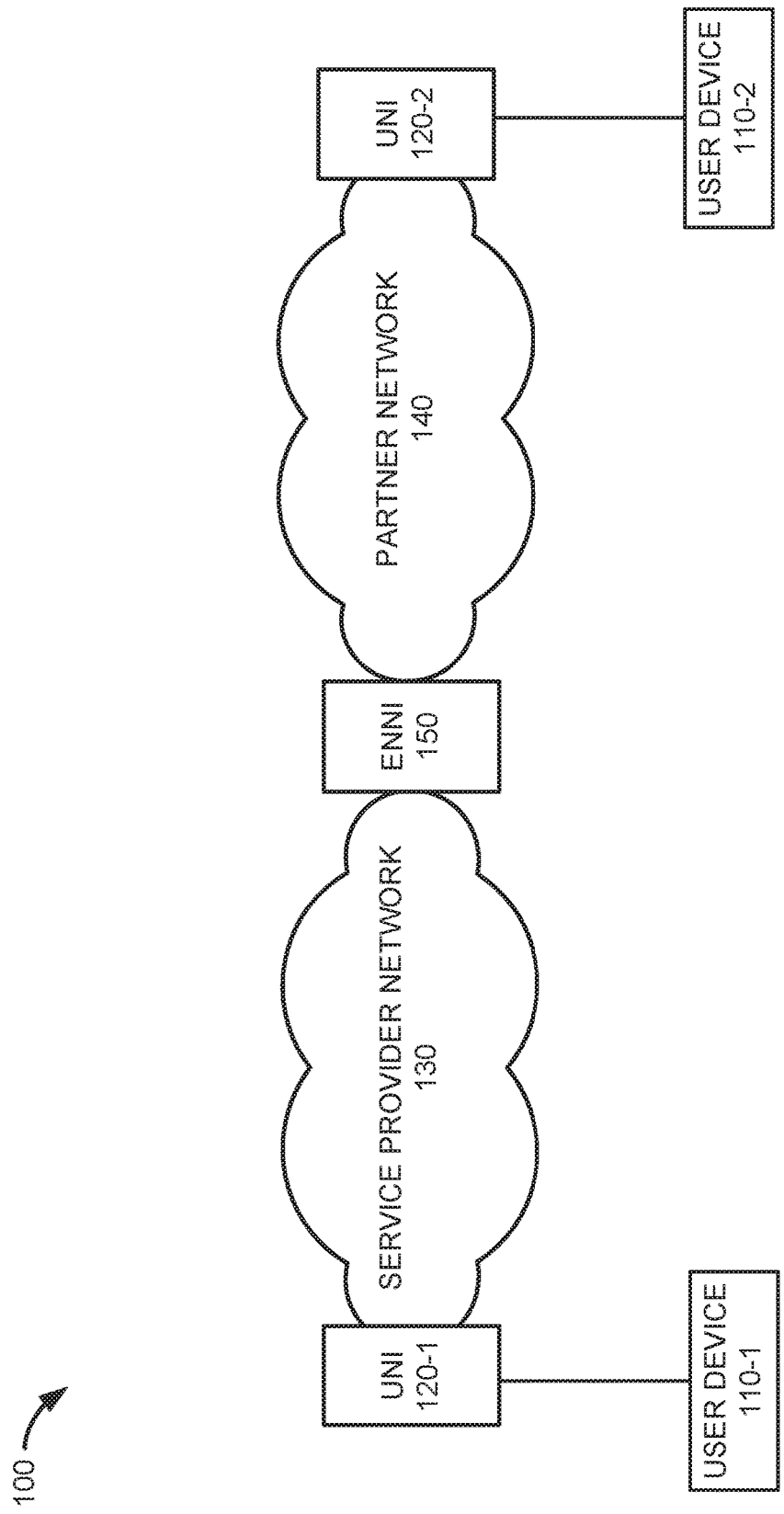
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 and 110-2, user network interface (UNI) 120-1, UNI 120-2, service provider network 130 (also referred to herein as network 130), partner network 140 and external network-to-network interface (ENNI) 150.

User devices 110-1 and 110-2 (referred to herein individually as user device 110 or 110-x, or collectively as user devices 110, and also referred to herein as user equipment (UE) 110) may include any computing device, such as a personal computer (PC), a server, a tablet computer, a notebook, a netbook, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, etc., that includes communication functionality. User device 110-1 may connect to network 130 via UNI 120-1 and user device 110-2 may connect to partner network 140 via UNI 120-2. User devices 110 may also connect to other devices in environment 100 via any conventional technique, such as wired, wireless, optical connections or a combination of these techniques. User device 110 and the person associated with user device 110 (e.g., the party holding or using user device 110) may be referred to collectively as user device 110, customer 110 or subscriber in the description below.

UNI 120-1 and 120-2 (referred to herein individually as UNI 120 or collectively as UNIs 120) may include a network interface to which a subscriber connects to transmit and receive information. For example, UNI 120 may include one or more computing devices or systems used to facilitate the transmission of information to/from a subscriber. In one implementation UNI 120 may act as an interface from a subscriber (e.g., a computer, such as a subscriber at user device 110) to allow the subscriber to Ethernet services, such as E-Line services from a service provider associated with network 130 and 140.

Service provider network 130 may include one or more wired, wireless and/or optical networks that are capable of receiving and transmitting data, voice and/or video signals. For example, service provider network 130 may include one or more Ethernet networks, packet switched networks such as Internet Protocol/Multi-Protocol Label Switching (IP/

MPLS) networks, Software Defined Networks (SDNs) or other type of packet network. Service provider network 130 may also include one or more wireless networks and may include a number of transmission towers for receiving wireless signals and forwarding the wireless signals toward the intended destination. Service provider network 130 may further include one or more satellite networks, one or more packet switched networks, such as an Internet protocol (IP) based network, a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Service provider network 130 may provide packet-switched services and wireless Internet protocol (IP) connectivity to user devices 110 to provide, for example, data, voice, and/or multimedia services. In an exemplary implementation, service provider network 130 may provide E-Line services to user device 110-1 communicating with user device 110-2 via partner network 140.

Partner network 140 may include similar elements as network 130. However, partner network 140 may be associated with a different service provider than network 130. For example, partner network may include one or more wired, wireless and/or optical networks that are capable of receiving and transmitting data, voice and/or video signals, such as one or more Ethernet networks, packet switched networks such as IP/MPLS networks, SDNs or other type of packet switched network that is operated by a different service provider/entity than network 130. Partner network 140 may also include one or more wireless networks which may include a number of transmission towers for receiving wireless signals and forwarding the wireless signals toward the intended destination, one or more satellite networks, one or more packet switched networks, such as an IP based network, a LAN, a PAN, a WiFi network, a Bluetooth network, a WAN, an LTE network, a 4G network, a 4G LTE Advanced network, a 5G network, an intranet, the Internet, or another type of network that is capable of transmitting data. Partner network 140 may also provide wireless packet-switched services and wireless IP connectivity to user devices 110 to provide, for example, data, voice, and/or multimedia services. In an exemplary implementation, partner network 140 may provide E-Line services to user device 110-1 communicating with user device 110-2 via network 130 and partner network 140.

ENNI 150 represents the interface or boundary between network 130 and partner network 140. ENNI 150 may include one or more computing devices that provide interoperability for data transmitted between network 130 and partner network 140, such as formatting frames transmitted to and received by ENNI 150, enforcing bandwidth profiles, performing switching, etc.

The exemplary configuration illustrated in FIG. 1 is provided for simplicity. It should be understood that a typical environment may include more or fewer devices than illustrated in FIG. 1. For example, environment 100 may include a large number (e.g., thousands or more) of user devices 110, hundreds of UNIs 120, additional networks and corresponding ENNIs 150, internal network-to-network interfaces (INNIs), etc. In addition, network 130 and partner network 140 may include additional elements, such as eNodeBs, base stations, switches, gateways, routers, monitoring devices, etc., that aid in routing data.

In addition, various functions are described below as being performed by particular components in environment 100. In other implementations, various functions described as being performed by one device may be performed by another device or multiple other devices, and/or various functions described as being performed by multiple devices may be combined and performed by a single device.

As described above, in some situations, a party at user device 110-1 may wish to communicate with the party at user device 110-2. As also described above, such a connection may traverse the networks of two different service providers, such as a service provider associated with network 130 and a different service provider associated with partner network 140. In such situations, a service provider (also referred to herein as an operator) associated with network 130 may provide an operator virtual connection (OVC) from UNI 120-1 to ENNI 150 and the service provider/operator associated with partner network 140 may also form an OVC from UNI 120-2 to ENNI 150.

Figure 2:
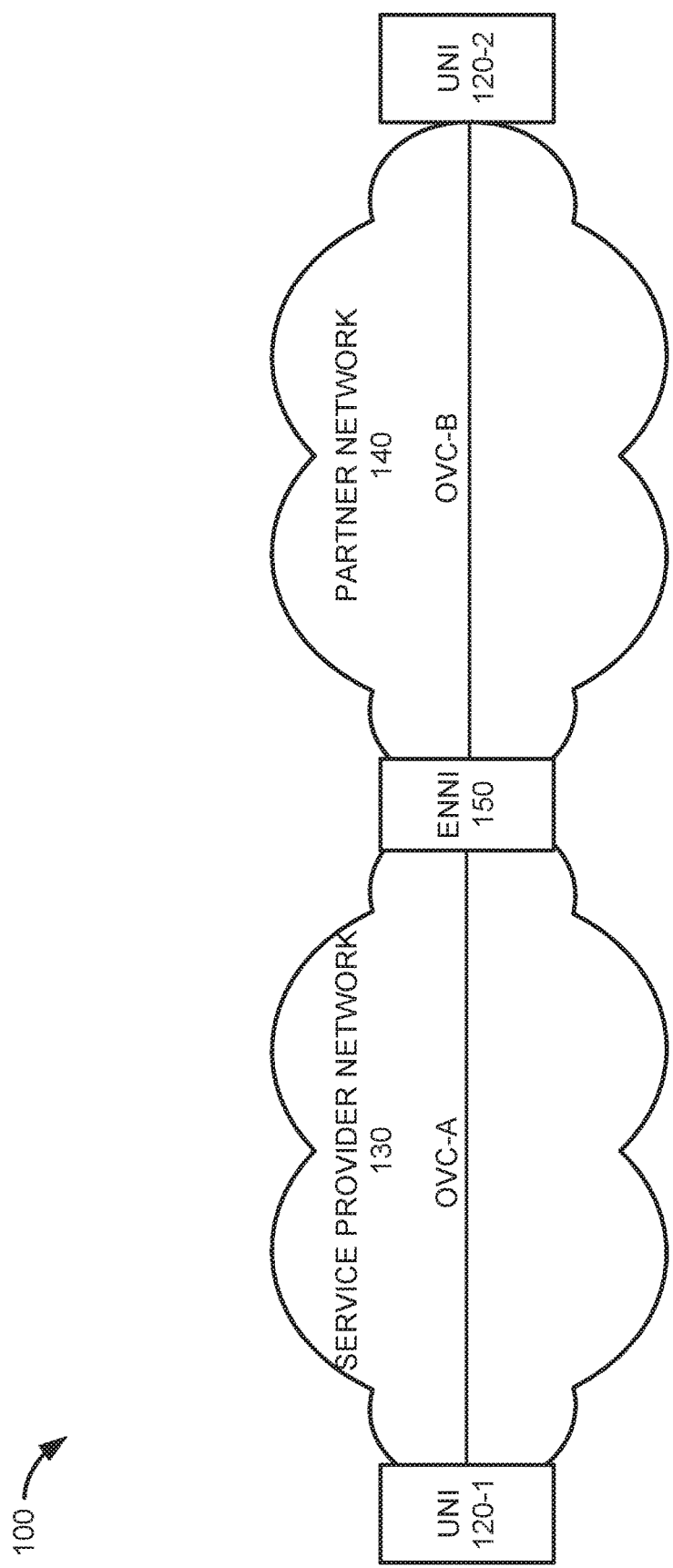
FIG. 2 illustrates an exemplary connection implemented in a portion of the environment of FIG. 1.

For example, FIG. 2 illustrates an OVC from UNI 120-1 (referred to herein as an on-net location) to ENNI 150, labeled OVC-A, and an OVC from UNI 120-2 (referred to herein as an off-net location) to ENNI 150, labeled OVC-B. Different operators associated with network 130 and partner network 140 may set up the OVCs in their respective networks and the connection from UNI 120-1 to UNI 120-2 may correspond to an E-Line service that traverses or engages both operators' networks. As described above, a customer associated with user device 110-1 may wish to change one or more attributes, such as a committed information rate (CIR), an excess information rate (EIR), committed burst size (CBS), excess burst size (EBS), etc., associated with an E-Line service. In the description below, it will be assumed that the E-Line service has been configured prior to the request for an on-demand modification of one or more attributes.

Figure 3:
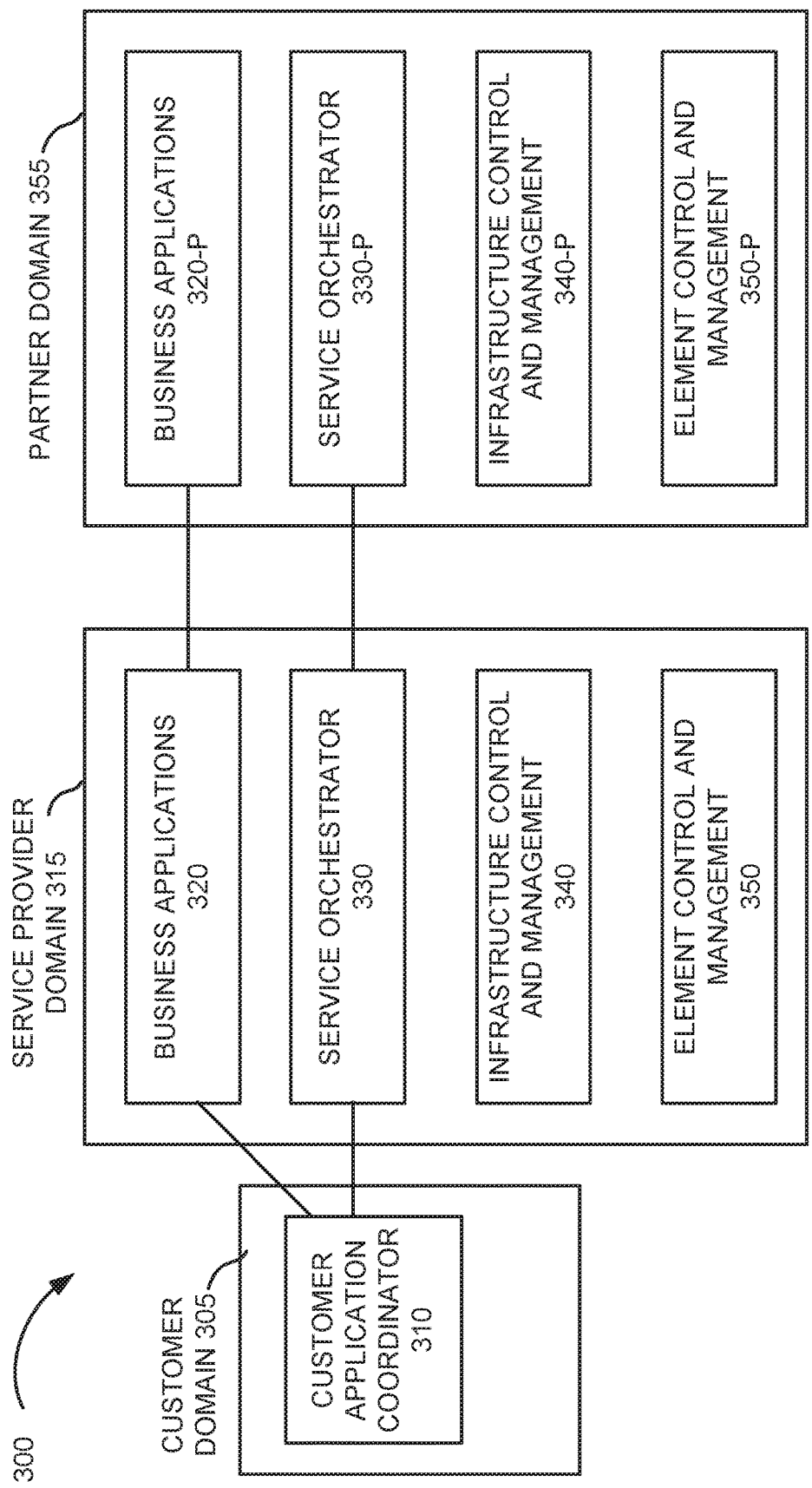
FIG. 3 illustrates an exemplary configuration of logic components associated with implementing a change to an Ethernet service provided in the environment of FIG. 1.

FIG. 3 illustrates a network infrastructure 300 associated with and/or implemented in environment 100 in accordance with an exemplary implementation. In one exemplary implementation, a portion of environment 300 may be associated with the operator of network 130 and a portion of infrastructure 300 may be associated with the operator of partner network 140. For example, customer domain 305 and service provider domain 315 may be associated with the operator of network 130 and partner domain 355 may be associated with the operator of partner network 140.

Referring to FIG. 3, customer domain 305 includes customer application coordinator 310. Customer application coordinator 315 may represent a portal or website associated with the operator of network 130. Customer application coordinator 310 may be configured to receive a request from a customer, such as a request to change a parameter associated with a service provided by the operator of network 130 (e.g., an E-Line service) and process the request in an on-demand manner without requiring processing of a new order and provisioning a new OVC, as described in detail below.

Service provider (SP) domain 315 may include business applications 320, Service Orchestrator 330, infrastructure control and management (ICM) 340, and element control and management (ECM) 350. Business applications 320 may include an operations support system (OSS)/billing support system (BSS) (also referred to herein as OSS/BSS 320) that includes logic and/or software associated with billing a customer for services provided by the operator of network 130. For example, if a customer changes a rate associated with an E-Line service, OSS/BSS 320 may receive information associated with the new rate and bill the customer the appropriate amount.

Service Orchestrator 330 may include one or more processing devices, logic and/or software to handle service requests and initiate processing for handling change requests in an on-demand manner. For example, Service Orchestrator 330 may interface with resources in network 130 to determine whether adequate resources are available to service the requested change. Service Orchestrator 330 may also interface with ICM 340 and ECM 350, as described in detail below.

ICM 340 may include one or more processing devices, logic and/or software to determine whether portions of network 130 include adequate resources to handle a requested service change. For example, ICM 340 may determine whether network interfaces, such as UNIs, NNIs, ENNIs, are adequately configured to handle a requested service change.

ECM 350 may include one or more processing devices, logic and/or software to determine whether other portions of network 130 include adequate resources to handle a requested service change. For example, ECM 350 may determine whether the endpoints are adequately configured to handle a requested service change.

Partner domain 355 may be associated with the service provider operating partner network 140. Partner domain 355 may include business applications 320-P (e.g., OSS/BSS 320-P), service orchestrator 330-P, ICM 340-P and ECM 350-P. Business applications 320-P, Service Orchestrator 330-P, ICM 340-P and ECM 350-P may be similar to elements 320, 330, 340 and 350 described above with respect to service provider domain 315, with the difference being that elements 320-P, 330-P, 340-P and 350-P perform the same or similar processing with respect to partner network 140, as described in detail below.

Although FIG. 3 shows exemplary components of network infrastructure 300, in other implementations, network infrastructure 300 may include fewer components, different components, differently arranged components, or additional components than depicted in FIG. 3. In addition, functions described as being performed by one of the components in FIG. 3 may alternatively be performed by another one or more of the components of network infrastructure 300.

Figure 4:
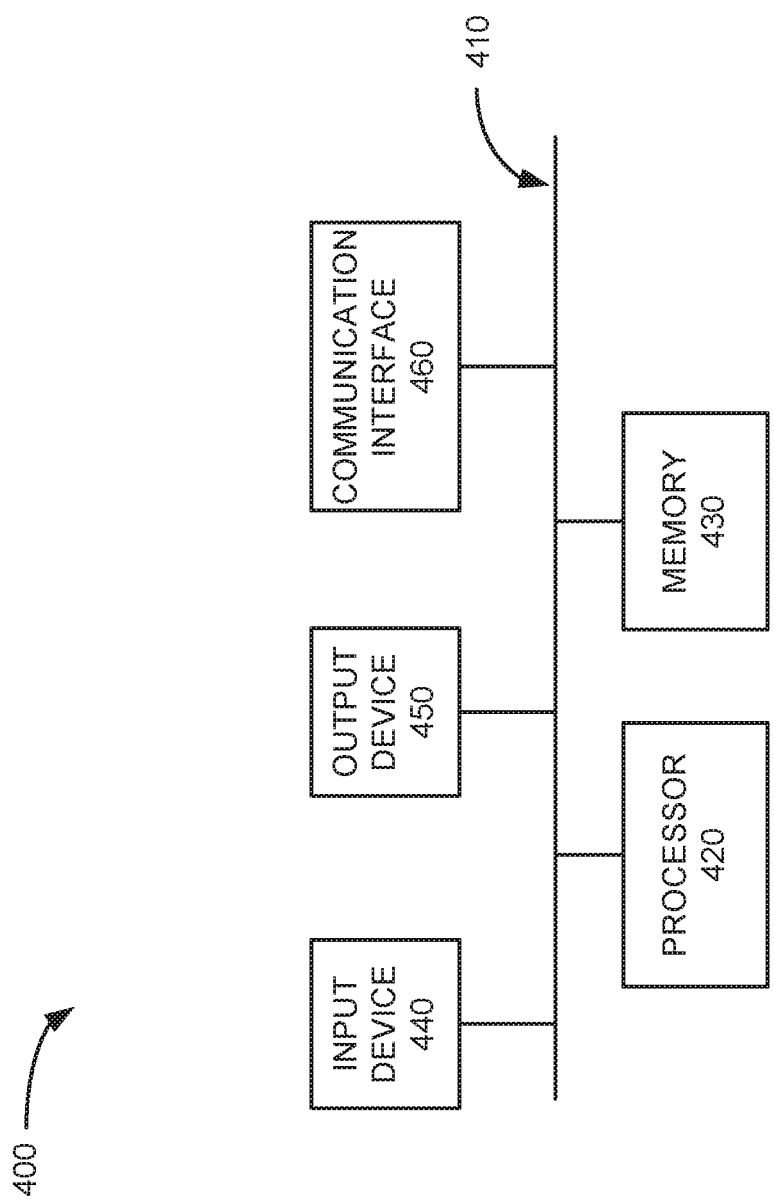
FIG. 4 illustrates an exemplary configuration of logic components associated with one or more of the devices of FIG. 1 and/or FIG. 3.

FIG. 4 illustrates a device 400 which includes an exemplary configuration of elements used to implement one or more devices of environment 100 and/or implement one or more components illustrated in network infrastructure 300. For example, device 400 may include elements used to implement elements in service provider domain 315 and/or elements within service partner domain 355, such as business applications 320, Service Orchestrator 330/330-P, ICM 340/340-P and/or ECM 350/350-P. Device 400 may also include elements used to implement devices in environment 100, such as user device 110, UNI 120 and/or ENNI 150. Referring to FIG. 4, device 400 may include bus 410, processor 420, memory 430, input device 440, output device 450 and communication interface 460. Bus 410 may include a path that permits communication among the elements of device 400.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SDD). Memory 430 may also include a magnetic and/or optical recording medium (e.g., a hard disk) and its corresponding drive.

Input device 440 may include a mechanism that permits a user to input information to device 400, such as a keyboard, a keypad, a mouse, a pen, a microphone, a touch screen, voice recognition and/or biometric mechanisms, etc. Output device 450 may include a mechanism that outputs information to the user, including a display (e.g., a liquid crystal display (LCD)), a printer, a speaker, etc. In some implementations, a touch screen display may act as both an input device and an output device.

Communication interface 460 may include one or more transceivers that device 400 uses to communicate with other devices via wired, wireless or optical mechanisms. For example, communication interface 460 may include one or more radio frequency (RF) transmitters, receivers and/or transceivers and one or more antennas for transmitting and receiving RF data via network 130 and/or partner network 140. Communication interface 460 may also include a modem or an Ethernet interface to a LAN, or other mechanisms for communicating with elements in a network, such as network 130 or partner network 140.

The exemplary configuration illustrated in FIG. 4 is provided for simplicity. It should be understood that device 400 may include more or fewer devices (e.g., a global positioning system (GPS) chipset) than illustrated in FIG. 4. In an exemplary implementation, device 400 may perform operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

Figure 5:
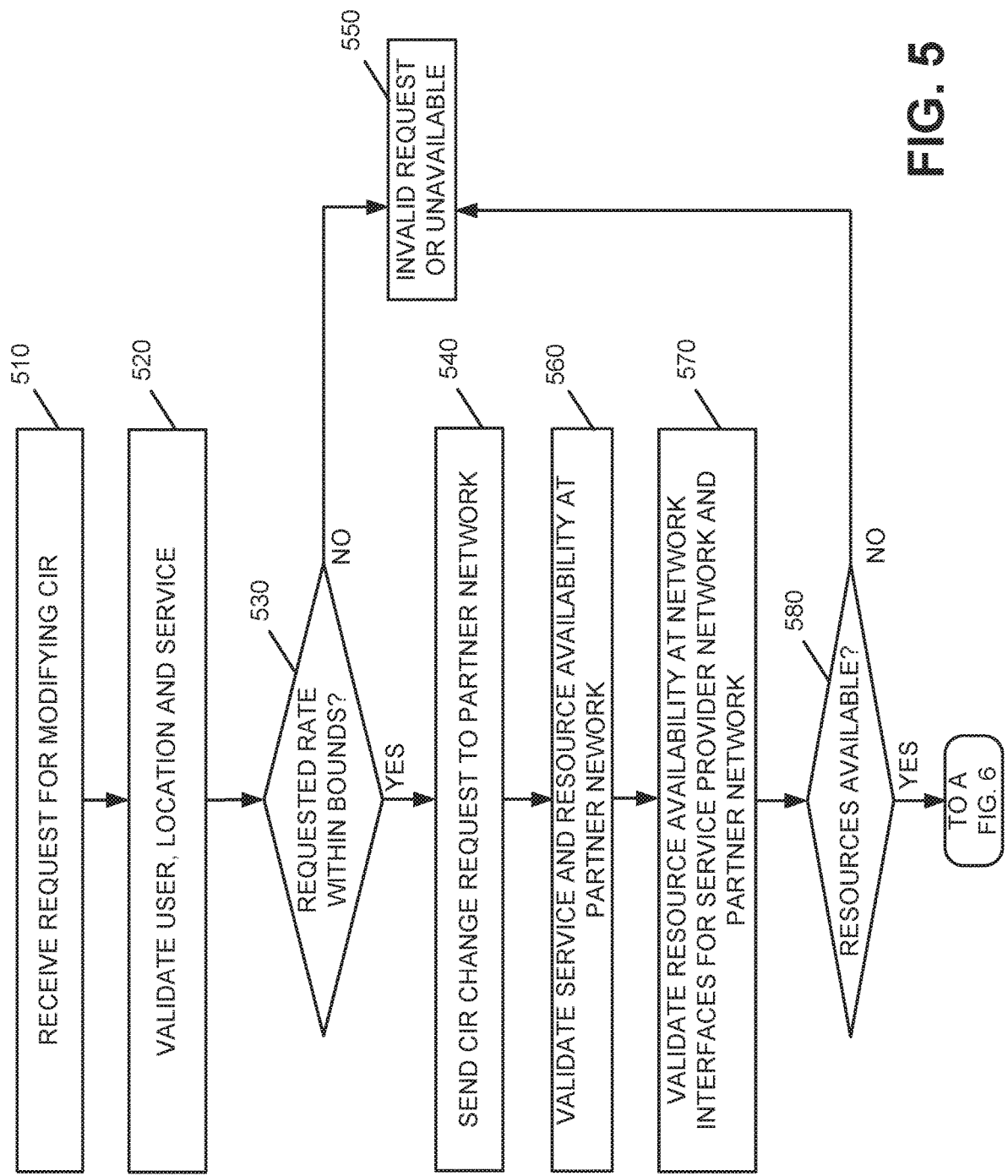
FIGS. 5 and 6 are flow diagrams illustrating processing by various components in the environment of FIGS. 1 and 3 in accordance with an exemplary implementation.
Figure 6:
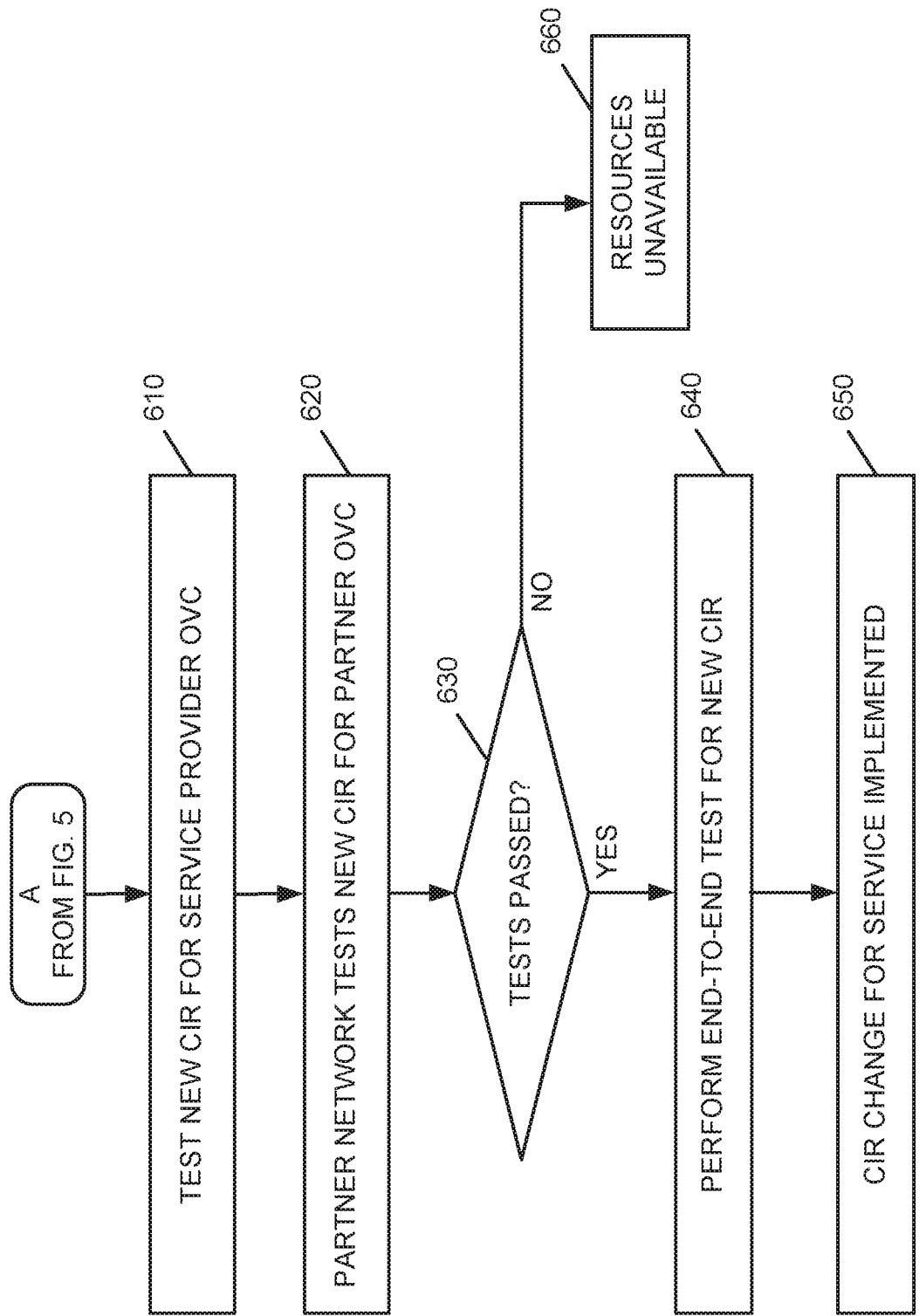
Figure 7A:
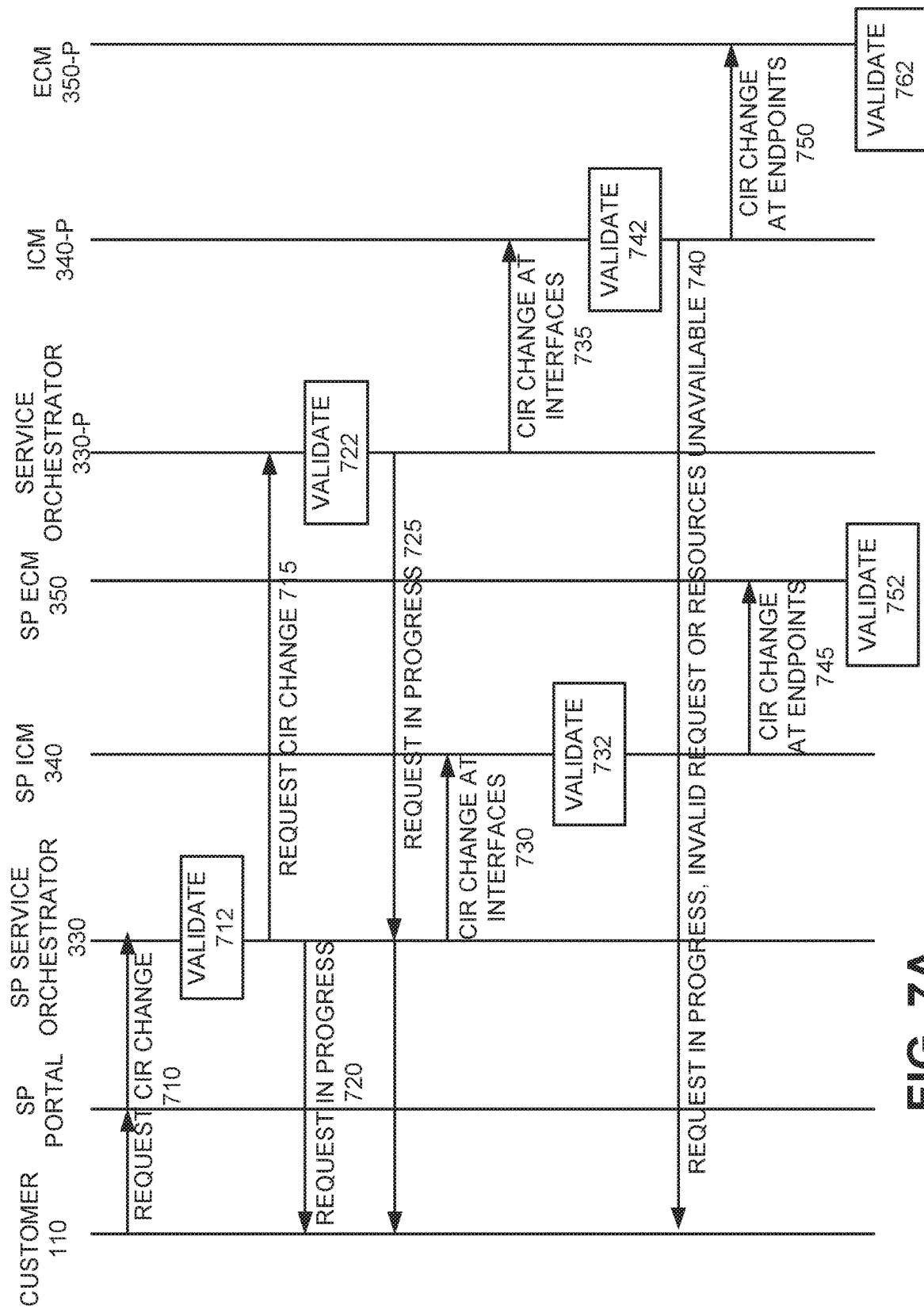
FIGS. 7A and 7B are signal flow diagrams associated with the processing of FIGS. 5 and 6.
Figure 7B:
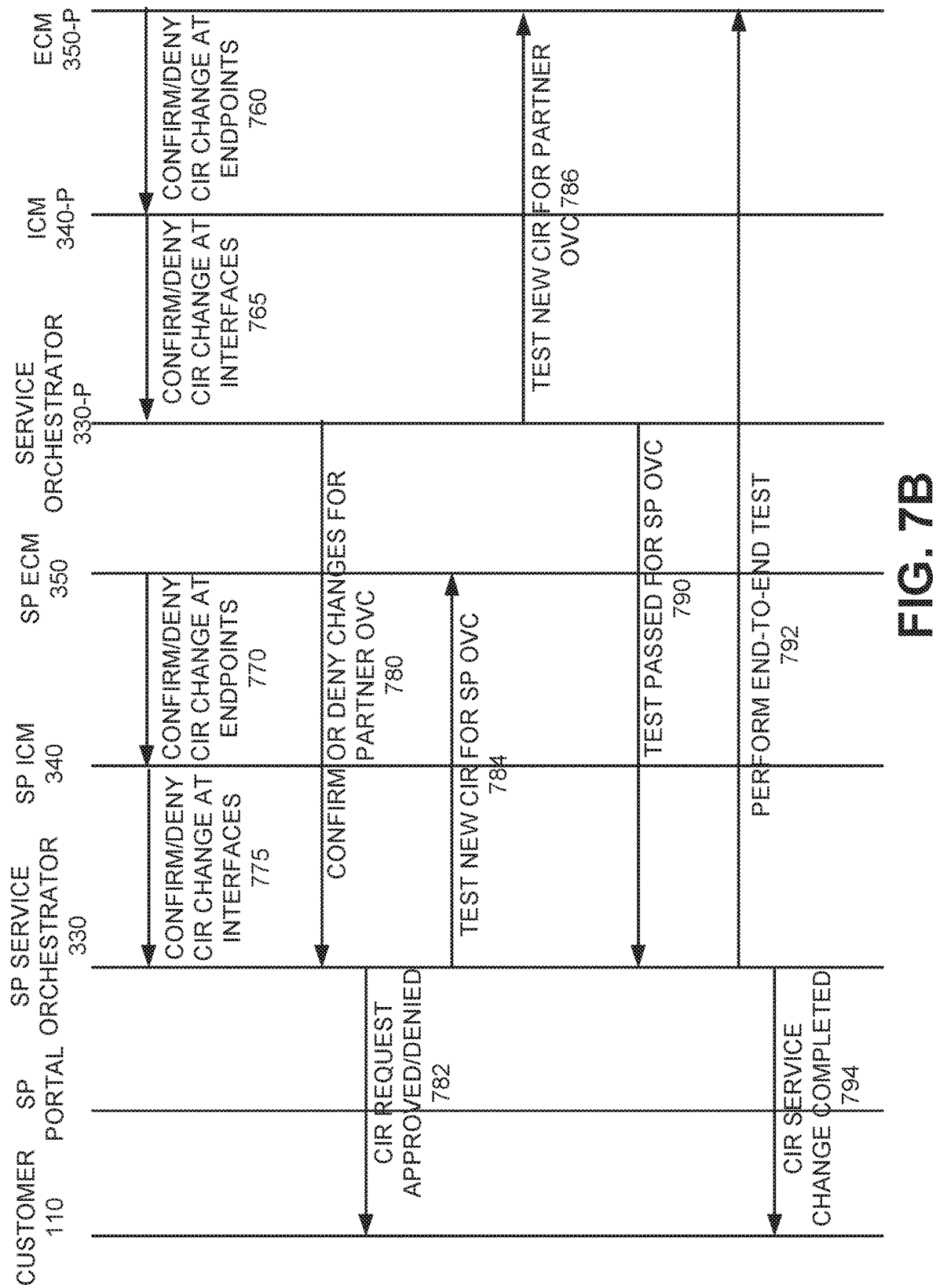

As described above, customers using Ethernet services (e.g., E-Line services) that traverse or engage multiple service providers may be unable to make changes to such services in an on-demand manner (e.g., without having to submit a new service order, having one or more service providers process the order, re-provision an OVC, etc.). FIGS. 5 and 6 are flow diagrams illustrating exemplary processing associated with on-demand modifications and testing for an Ethernet service. FIGS. 7A and 7B are signal flow diagrams associated with the processing shown in FIGS. 5 and 6.

In one implementation, customer 110 may modify a parameter of an E-Line service, such as the committed information rate (CIR) parameter without having to negotiate with the service provider. In this implementation, customer 110 may modify the CIR up to the UNI physical (PHY) layer rate minus the bandwidth for Ethernet frame overhead for an E-Line service without having to negotiate the new CIR with the service provider. In another implementation, customer 110 may modify the CIR up to, for example, the UNI PHY layer rate minus the bandwidth for Ethernet frame overhead for an E-Line service via a negotiation process with the service provider associated with network 130. In the description that follows, assume that customer 110 requests a modification of the CIR and that the modification is processed via a negotiation with the service provider associated with network 130.

Processing may begin with a user at user device 110-1 (also referred to herein as a customer, customer 110, subscriber or subscriber 110) transmitting a request for modifying, for example, a CIR parameter for an Ethernet virtual connection (EVC). The EVC may be provided by the operator associated with network 130, which implements a segment of the EVC, such as OVC-A illustrated in FIG. 2. For example, customer 110 may transmit a request for a CIR change to a portal or website associated with the service provider (SP) operating network 130. The SP portal may route the request to SP Service Orchestrator 330 (FIG. 7A, 710). SP Service Orchestrator 330 receives the request (FIG. 5, block 510).

SP Service Orchestrator 330 may validate the customer, based on, for example, a user/customer identifier, password, etc. SP Service Orchestrator 330 may also validate the location associated with the customer (e.g., ensure that the customer is at a location serviced by the operator of service provider network 130) and that the E-Line service is between location A and location B. SP Service Orchestrator 330 may also validate that the customer is currently subscribing to the E-Line service associated with the CIR change request (block 520; FIG. 7, 712). In some implementations, SP Service Orchestrator 330 may access OSS/BSS 320 associated with the operator of service provider network 130 to validate the customer.

If the validation is successful, SP Service Orchestrator 330 may also determine if the requested CIR change is within limits or bounds provided by the operator associated with network 130 (block 530). For example, SP Service Orchestrator 330 may access a CIR list or table that provides information regarding available CIRs for the service provider. In some implementations, SP Service Orchestrator 330 may access OSS/BSS 320 to determine if the CIR change is within limits or bounds set by the operator of network 130. In some implementations, SP Service Orchestrator 330 may also determine if network 130 includes adequate resources to provide the modified CIR at the current time based on network load, expected load, resources in service/out of service, etc. SP Service Orchestrator 330 may further determine if partner network 140 includes adequate resources to provide the modified CIR, if such information is available to the operator of network 130. In the description below, assume that the SP associated with network 130 does not have access to information regarding resources in partner network 140.

If the requested CIR change request is within the bounds/limits set by the operator associated with service provider network 130 (block 530—yes), SP Service Orchestrator 330 forwards the CIR change request to partner network 140 (block 540). For example, SP Service Orchestrator 330 may forward the CIR change request to partner Service Orchestrator 330-P (FIG. 7A, 715). SP Service Orchestrator 330 may also transmit a request in progress message to the customer 110 (FIG. 7A, 720).

If the rate associated with the requested CIR is not an allowable rate (e.g., the rate is greater than the maximum CIR allowed/provided by the operator of network 130), or that resources are not currently available to service the requested rate (block 530—no), SP Service Orchestrator 330 may determine that the rate is not allowed/available (block 550). SP Service Orchestrator 330 may also transmit a signal to customer 110 indicating the request is invalid or resources are unavailable at the present time. Assuming that the request/rate is valid and the resources for the requested service are available in the service provider's network 130, partner Service Orchestrator 330-P receives the CIR change request, validates the CIR request and determines whether adequate resources are available to service the requested CIR in partner network 140 (block 560; FIG. 7A, 722). If the validation is successful and the resources are available at partner network 140, partner service orchestrator 330-P may send a request in progress message to SP Service Orchestrator 330, which relays the request in progress message to customer 110 (FIG. 7A, 725).

In response to both SP Service Orchestrator 330 and Service Orchestrator 330-P determining that resources are available at service provider network 130 and partner network 140, respectively, SP Service Orchestrator 330 and Service Orchestrator 330-P may each initiate the validation regarding availability of network resources at the interfaces and endpoints in network 130 and partner network 140, respectively (FIG. 5, 570).

For example, Service Orchestrator 330 may send a message to SP ICM 340 to validate the service and resource availability in network 130 at the network interfaces (FIG. 7A, 730). As part of the validation, SP ICM 340 may determine if the EVC associated with the CIR change is associated with ENNI 150, UNI 120-1 and INNIs within service provider network 130. SP ICM 340 may also determine whether there is enough capacity at these interfaces to support the requested CIR (FIG. 7A, 732). Concurrently or substantially concurrently with SP ICM 340 validating the service and resource availability at the interfaces in service provider network 130, Service Orchestrator 330-P may send a similar CIR change message to ICM 340-P (FIG. 7A, 735), and ICM 340-P may validate service and resource availability at the network interfaces (ENNI, UNI, INNIs) in partner network 140 (FIG. 7A, 742). That is, ICM 340-P may determine if the EVC associated with the CIR change is associated with ENNI 150, UNI 120-2 and INNIs associated with partner network 140 and whether these network interfaces have enough capacity to support the requested CIR.

After performing the validations, SP ICM 340 and partner ICM 340-P may forward a request in progress message, an invalid request or a resources unavailable message based on the validations (FIG. 7A, 740). For example, assume that the request is valid and resources are available at the network interfaces in partner network 140. In this case, Service Orchestrator 330-P sends a request in progress message to service orchestrator 330. Assume that resources are also available in service provider network 130. Service Orchestrator 330 forwards the request in progress message to customer 110. If the resources are unavailable at either service provider network 130 or partner network 140, SP ICM 340 and/or ICM 340-P may send a resources unavailable message, which is forwarded to customer 110 (FIG. 7A, 740).

After validating the service and determining that there is adequate resource availability at the interfaces in service provider network 130, SP ICM 340 may forward the CIR change to SP ECM 350 to modify the CIR to the customer requested value at the EVC end point of the on-net UNI (i.e., UNI 120-1) (FIG. 7A, 745). In situations in which SP ICM 340 does not have adequate information regarding the capacity information regarding the on-net UNI of network 130, SP ECM 350 receives the CIR change request and validates the service and resource availability at the on-net UNI (FIG. 7A, 752). Similarly, ICM 340-P forwards the CIR change to partner ECM 350-P to modify the CIR to the customer requested value at the EVC end point of the off-net UNI (i.e., UNI 120-2) (FIG. 7A, 750). In situations in which ICM 340-P does not have adequate information regarding the capacity information regarding the off-net UNI 120-2, ECM 350-P validates the service and resource availability at the off-net UNI 120-2 (FIG. 7A, 762).

Partner ECM 350-P may then send a message confirming or denying the CIR change at the endpoints to partner ICM 340-P (FIG. 7B, 760). Partner ICM 340-P may also forward a message confirming or denying the CIR change at the network interfaces to partner service orchestrator 330-P (FIG. 7B, 765). In an alternative implementation, service orchestrator 330-P, ICM 340-P, Service Orchestrator 330-P may each send separate messages to service provider network 130 upon completion of the validations. Similarly, SP ECM 350 and SP ICM 340 may send messages confirming or denying the CIR change at the endpoints and network interfaces to SP Service Orchestrator 330 (FIG. 7B, 770, 775).

If resources are available at the endpoints and interfaces, Service Orchestrator 330-P may send a message confirming or denying the CIR change request to SP Service Orchestrator 330 (FIG. 7B, 780). Service Orchestrator 330 may also determine if adequate resources are available at the endpoints and interfaces in network 130 based on received messages 770 and 775 and signal customer 110 with the status of the CIR request (FIG. 7B, 782). For example, if adequate resources are available in both service provider network 130 and partner network 140, SP Service Orchestrator 330 may then send a message to customer 110 indicating that the CIR change request is approved. If adequate resources are not available in either service provider network 130 or partner network 140 (block 580—no), SP Service Orchestrator 330 may send a message to customer 110 indicating that resources are unavailable at the present time and the CIR change is denied (block 550; FIG. 7B, 782).

Assuming that the adequate resources are available at both service provider network 130 and partner network 140 (i.e., the CIR change request is approved) (block 580—yes), the operator associated with service provider network 130 may initiate a test of the E-line with the modified CIR parameter. For example, SP Service Orchestrator 330 may test OVC-A (FIG. 2) in service provider network 130 according to the new CIR (FIG. 6, 610; FIG. 7B, 784). Concurrently with SP Service Orchestrator 330 initiating a test in network 130, Service Orchestrator 330-P may test OVC-B (FIG. 2) in partner network 140 based on the new CIR (block 620; FIG. 7B, 786). The initiation of the test of OVC-B in partner network 140 may be based on, for example, a contract/agreement between the parties associated with service provider network 130 and partner network 140. The test in each of networks 130 and 140 may include sending test packets from customer 110 location to an end point location to test the CIR (i.e., test OVC throughput). For example, Service Orchestrator 330 may send test packets from UNI 120-1 to ENNI 150 and determine if the throughput meets the new CIR. Similarly, partner Service Orchestrator 330-P may send test packets from ENNI 150 to UNI 120-2 and determine whether the throughput meets the new CIR.

After Service Orchestrator 330-P completes testing of OVC-B, Service Orchestrator 350-P sends a message to Service Orchestrator 330 indicating a pass or failure of the test (FIG. 7, 790). Service Orchestrator 330 may then determine if the tests passed (block 630) (i.e., tests of OVC-A and OVC-B). In some implementations, if Service Orchestrator 330 determines that the tests passed in both partner network 140 and service provider network 130 (i.e., the data throughput meets or exceeds the new CIR) (block 630—yes), the operator associated with service provider network 130 may initiate an end-to-end test of the entire EVC to ensure that the entire circuit throughput meets the new CIR (FIG. 6, 640; FIG. 7, 792). In this case, SP Service Orchestrator 330 may transmit test packets from UNI 120-1 to UNI 120-2 and determine if the end-to-end throughput of the EVC meets the new CIR. In other implementations, the end-to-end test of the entire EVC may be bypassed.

In either case, if the testing of OVC-A and OVC-B both passed (e.g., the data throughput meets the new CIR), and the optional end-to-end EVC test passed in situations in which the end-to-end EVC test is also performed, Service Orchestrator 330 forwards a message indicating that the CIR service change request has been completed (FIG. 7B, 794). In this case, the new CIR for the E-line service is automatically implemented for customer 110 (block 650). If the test fails at any point in network 130 or partner network 140 (block 630—no) (i.e., the data throughput does not meet the new CIR), Service Orchestrator 330 forwards a message to customer 110 indicating that the resources are unavailable at the current time (block 660).

Figure 8:
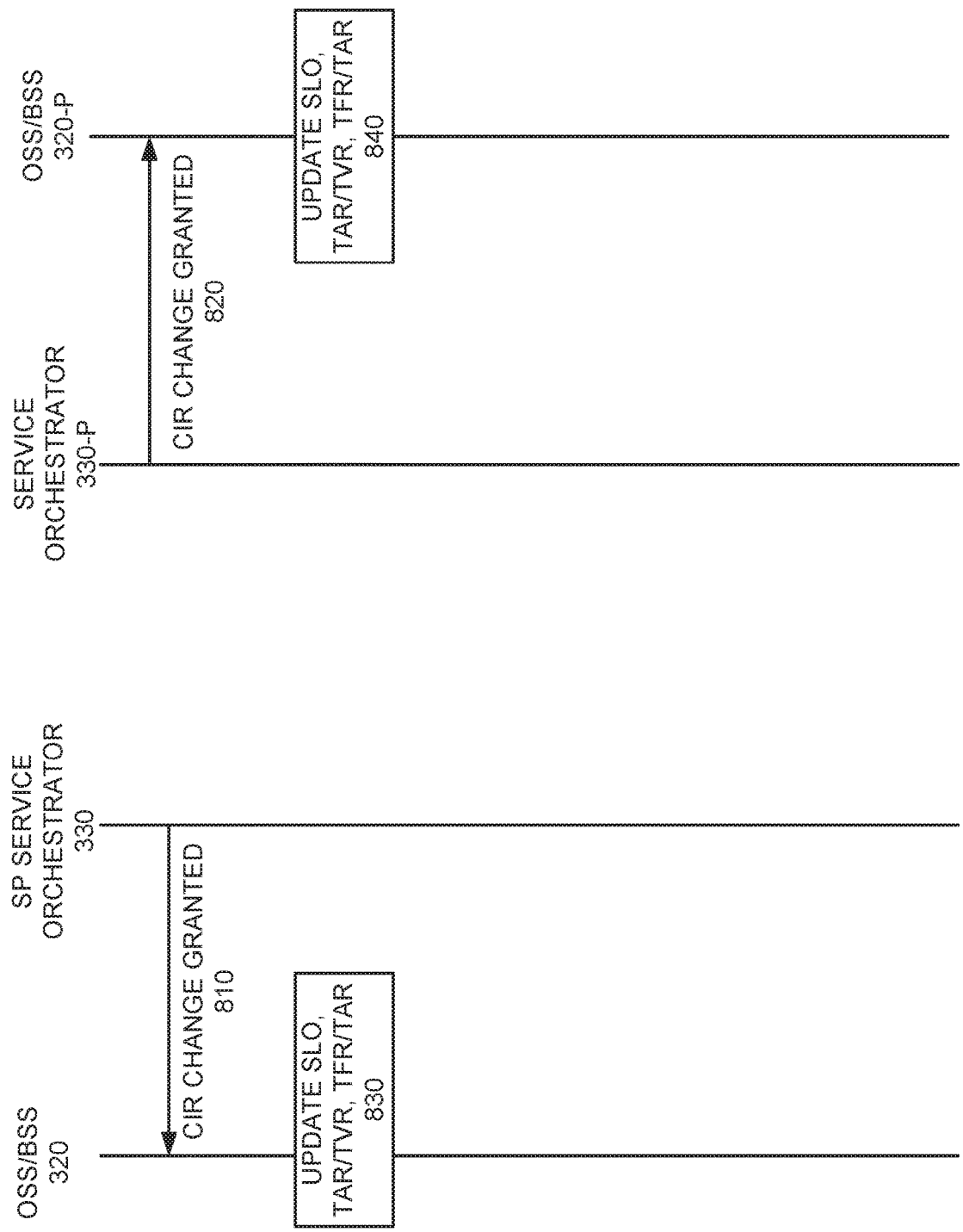
FIG. 8 is a signal flow diagram associated with updating service level objectives associated with an E-Line modification.

FIG. 8 is a signal flow diagram associated with providing billing changes and service level objective (SLO) updates for an implemented CIR change. For example, if testing is successful (i.e., the data throughput meets or exceeds the new CIR) and the CIR change is implemented, SP Service Orchestrator 330 initiates a new billing procedure. For example, SP Service Orchestrator 330 sends a message to OSS/BSS 320 indicating that CIR is changed from "x" to "y" (e.g., from a first rate to a second rate) (FIG. 8, 810). Similarly, Service Orchestrator 330-P sends a message to its OSS/BSS 320-P indicating that the CIR is changed from x to y (FIG. 8, 820).

In accordance with one implementation, based on a contract/agreement between the operators associated with service provider network 130 and partner network 140, once the service provider network 130 and partner network 140 confirm the CIR change, the service level objectives (SLOs) between the service provider associated with network 130 and partner network 140 may be updated (FIG. 8, 830). For example, the percentage of valid CIR modification requests that are accepted may be updated. The percentage of valid modification requests may correspond to the total number of modification requests accepted for an elastic service instance (i.e., CIR in this example) during a measurement interval (TAR) divided by the total number of valid CIR modification requests received during the measurement interval (TVR) (i.e., TAR/TVR). The term "elastic" indicates the capability to modify an active service by changing the value of one or more service attributes (e.g., CIR value in this example).

The percentage of accepted requests that are fulfilled may also be updated. The percentage of accepted requests that are fulfilled may correspond to the total number of CIR modification requests fulfilled during a measurement interval (TFR) divided by the total number of CIR modification requests accepted during the measurement interval (TAR) (i.e., TFR/TAR). For example, in situations in which there are not enough resources to support the CIR change, despite the CIR change request being a valid request (based on, for example, the agreement between the service providers associated with networks 130 and 140), SP Service Orchestrator 330 sends a message to OSS/BSS 320 indicating that a valid request was not fulfilled. This allows OSS/BSS 320 to update the percentage of accepted requests that were fulfilled (TFR/TAR). Partner network 140 may similarly update its SLO parameters, including the percentage of valid requests accepted (TAR/TVR) and the percentage of accepted requests that have been fulfilled (TFR/TAR) (FIG. 8, 840).

As described above, in some implementations, the service provider associated with service provider network 130 may confirm the CIR change without end-to-end testing of the EVC (e.g., the EVC from UNI 120-1 to UNI 120-2 shown in FIG. 2). In this case, SP Service Orchestrator 330 sends a message to OSS/BSS 320 to initiate new billing requirements associated with the new CIR and update on-demand SLO parameters, such as the percentage of valid requests accepted (TAR/TVR) and the percentage of accepted requests fulfilled (TFR/TAR). In this implementation, the service provider associated with partner network 140 may similarly update its billing requirements and update the on-demand SLO parameters without performing end-to-end testing of the EVC.

As described above, service provider network 130 and partner network 140 may support on-demand modifications of CIR. In some implementations, SP Service Orchestrator 330 and Service Orchestrator 330-P may exchange timing information and/or timing requirements associated with implementing the on-demand modifications.

For example, in one implementation, SP Service Orchestrator 330 and Service Orchestrator 330-P may exchange the following parameters: $CIR_{elastic}$ which corresponds to the CIR value after the on-demand modification; $CIR_{lb}$ which corresponds to a lower bound or minimum value for CIR; $CIR_{ub}$ which corresponds to an upper bound or maximum value for CIR; $N_{max,CIR}$ which corresponds to the maximum number of increments to increase CIR from $CIR_{lb}$ to $CIR_{ub}$; $CIR_{next}$ which corresponds to a subscriber defined value for the CIR after the end time of an immediate CIR change request or a CIR change request scheduled for a future date and time; $CIR_{increment}$ which corresponds to a granularity which is the minimum incremental value for CIR; $T_{r-sp-part}$ which corresponds to the time interval for partner network 140 delivery of elastic E-line attribute modification request; and $T_{c-m-sp-part}$ which corresponds to the time interval for the subscriber modification or cancellation of an on-demand subscriber modification of an elastic E-line attribute requested for a future date and time from partner network 140. SP Service Orchestrator 330 may exchange these parameters with Service Orchestrator 330-P during the initiation or early stages associated with provisioning the elastic Access E-Line service.

In an exemplary implementation, SP Service Orchestrator 330 may also measure the following parameters: $T_{r-sp-sab}$ which corresponds to the time interval for service provider delivery of elastic E-line attribute modification requests by a subscriber; $T_{r-sp-part}$; $T_{c-m-sp-sub}$ which corresponds to the time interval for subscriber modification or cancellation of an on-demand subscriber modification of an elastic E-line attribute requested for a future date and time; and $T_{c-m-sp-part}$. Measuring these parameters enable the operator of service provider network 130 (and partner network 140) to ensure that SLOs are being met.

In each case, the operators of network 130 and partner network 140 make modifications to an E-Line service in an on-demand manner without requiring processing of new service orders and provisioning of new OVCs and/or EVC. In addition, billing parameters are updated in a real-time manner.

In another implementation, customer 110 may request modification of other parameters associated with an E-Line service. For example, customer 110 may request a modification of an excess information rate (EIR) parameter for an E-Line service. In this case, processing associated with the requested EIR may proceed in a manner similar to that described above for the CIR change request. That is, the operator of network 130 may perform an on-demand modification and determine if capacity is available for the requested change without having to process a new order and, for example, without requiring the provisioning of a new OVC or EVC. Similarly, the operator of partner network 140 may perform an on-demand modification and determine if capacity is available for the requested EIR change in partner network 140. If successful (e.g., adequate resources exist at both network 130 and partner network 140), the change is automatically implemented.

In still another implementation, customer 110 may request modification of other parameters associated with an E-Line service. For example, customer 110 may request a modification of a committed burst size (CBS) parameter or an excess burst size (EBS) parameter for an E-Line service. In this case, processing associated with the requested CBS or EBS may proceed in a manner similar to that described above for the CIR change request. That is, the operator of network 130 may perform an on-demand modification and determine if capacity is available for the requested change without having to process a new order and without requiring the provisioning of a new OVC. Similarly, the operator of partner network 140 may perform an on-demand modification and determine if capacity is available for the requested CBS/EBS change in partner network 140. If successful (e.g., adequate resources exist at both network 130 and partner network 140), the change is automatically implemented.

For each requested modification of parameters associated with an E-Line service (e.g., EIR, CBS, etc.), SP Service Orchestrator 330-P may notify OSS/BSS 320 to allow for proper billing associated with the attribute modification. In addition, SP Service Orchestrator 330 and Service Orchestrator 330-P may exchange attribute information, such as upper and lower bounds for the attribute, granularity information, values after the modification, etc., similar to that discussed above with respect to CIR modification requests to ensure that SLOs are being met.

Implementations described herein provide for modification of E-Line services on-demand. A customer may request a change to an E-Line service and operators associated with networks over which the E-Line is provisioned determine whether adequate resources are available to service the requested change. If such resources are available, operators automatically implement the change with respect to the E-Line, and without the customer having to submit a new service order and wait a long time before the change is implemented.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to implementing changes to an Ethernet service. In other implementations, other types of services that traverse networks of more than one service provider may be implemented in a similar manner.

Further, while series of acts have been described with respect to FIGS. 5 and 6 and signal flows with respect to FIGS. 7A, 7B and 8, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, from a user, a first message requesting a change to a parameter associated with an existing Ethernet service, wherein the existing Ethernet service includes routing data from a user device associated with the user to a destination device via a first service provider and a second service provider, wherein the Ethernet service is provided from a location associated with the user to a destination location serviced by the second service provider that is different from the first service provider;
   determining, by the first service provider, whether resources are available in a first network associated with the first service provider to fulfill the requested change;
   determining, by the second service provider, whether resources are available in a second network associated with the second service provider to fulfill the requested change;
   sending a second message by the first provider and to the user, wherein the second message indicates whether the change to the parameter associated with the existing Ethernet service is accepted; and
   in response to determining that the change is accepted, automatically implementing the change for the existing Ethernet service.

2. The computer-implemented method of claim 1, further comprising:
   testing the Ethernet service with the requested change in the first network;
   testing the Ethernet service with the requested change in the second network; and
   determining, based on the testing, whether the first network and second network satisfy requirements associated with the requested change.

3. The computer-implemented method of claim 1, wherein the Ethernet service comprises an Ethernet Line (E-Line) service.

4. The computer-implemented method of claim 3, wherein the E-Line service traverses an external network-to-network interface between the first network associated with the first service provider and the second network associated with the second service provider.

5. The computer-implemented method of claim 1, wherein the requested change to the parameter comprises a committed information rate (CIR) change for the Ethernet service.

6. The computer-implemented method of claim 5, wherein the determining whether resources are available in the first network comprises determining whether resources are available at a user network interface (UNI) and an external network-to-network interface (ENNI) to support the CIR change.

7. The computer-implemented method of claim 6, further comprising:
   determining whether the first network and second network are configured to support a CIR associated with the CIR change.

8. The computer-implemented method of claim 7, wherein the determining whether the first network is configured to support the CIR comprises:
   accessing an operational support system or billing support system associated with the first service provider to determine whether the first network is configured to support the CIR associated with the CIR change, and wherein the method further comprises:
   updating the operational support system or billing system based on the CIR change being implemented.

9. The computer-implemented method of claim 1, wherein the requested change to the parameter comprises an excess information rate change, a committed burst size change or an excess burst size change.

10. The computer-implemented method of claim 1, wherein the automatically implementing the change for the Ethernet service comprises implementing the change without re-provisioning an operator virtual circuit or Ethernet virtual circuit.

11. A system, comprising:
    a memory; and
    at least one device configured to:
       receive, from a user, a first message requesting a change to a parameter associated with an existing Ethernet service, wherein the existing Ethernet service includes routing data from a user device associated with the user to a destination device via at least a first service provider and a second service provider, wherein the Ethernet service is provided from a location associated with the user to a destination location serviced by the second service provider that is different from the first service provider, determine, whether resources are available in a first network associated with the first service provider to fulfill the requested change, determine whether resources are available in a second network associated with the second service provider to fulfill the requested change, send a second message to the user, wherein the second message indicates whether the change is accepted, and in response to determining that the change is accepted, automatically implement the change for the existing Ethernet service.

12. The system of claim 11, wherein the at least one device is further configured to:

test the Ethernet service with respect to the requested change, and determine whether the first network and second network satisfy requirements associated with the requested change.

13. The system of claim 11, wherein the Ethernet service comprises an Ethernet-Line service that traverses an external network-to-network interface between the first network associated with the first service provider and the second network associated with the second service provider.

14. The system of claim 11, wherein the requested change to the parameter comprises a committed information rate (CIR) change for the Ethernet service.

15. The system of claim 14, wherein when determining whether resources are available in the first network, the at least one device is configured to determine whether resources are available at a user network interface (UNI) and an external network-to-network interface (ENNI) to support the CIR change.

16. The system of claim 14, wherein the at least one device is further configured to:

determine whether the first network and second network are configured to support a CIR associated with the CIR change.

17. The system of claim 11, wherein the requested change to the parameter comprises an excess information rate change, a committed burst size change or an excess burst size change.

18. The system of claim 11, wherein when automatically implementing the change for the Ethernet service, the at least one device is configured to implement the change without re-provisioning an operator virtual circuit or Ethernet virtual circuit.

19. A non-transitory computer-readable medium having stored thereon sequences of instructions which, when executed by at least one processor, cause the at least one processor to:

receive a first message requesting a change to a parameter associated with an existing Ethernet service, wherein the existing Ethernet service includes routing data from a user device associated with the user to a destination device via a first service provider and a second service provider, wherein the Ethernet service is provided from a location associated with the user to a destination location serviced by the second service provider that is different from the first service provider;

determine, whether resources are available in a first network associated with the first service provider to fulfill the requested change;

determine whether resources are available in a second network associated with the second service provider to fulfill the requested change;

send a second message to a user, wherein the second message indicates whether the change is accepted; and in response to determining that the change to the parameter is accepted, automatically implement the change for the existing Ethernet service.

20. The non-transitory computer-readable medium of claim 19, when automatically implementing the change for the Ethernet service, the instructions cause the at least one processor to implement the change without re-provisioning an operator virtual circuit or Ethernet virtual circuit.

* * * * *